(12) United States Patent  
Zampieri et al.

(10) Patent No.: US 12,326,740 B2  
(45) Date of Patent: Jun. 10, 2025

(54) GAS REGULATOR

(71) Applicant: PIETRO FIORENTINI S.p.A., Arcugnano (IT)

(72) Inventors: Nevio Zampieri, Montegalda (IT); Claudio Imboccioli, Creazzo (IT)

(73) Assignee: PIETRO FIORENTINI S.P.A., Arcugnano (IT)

( * ) Notice: Subject to any disclaimer, the term of this patent is extended or adjusted under 35 U.S.C. 154(b) by 71 days.

(21) Appl. No.: 18/557,337

(22) PCT Filed: May 3, 2022

(86) PCT No.: PCT/IB2022/054075  
§ 371 (c)(1),  
(2) Date: Oct. 26, 2023

(87) PCT Pub. No.: WO2022/234450  
PCT Pub. Date: Nov. 10, 2022

(65) Prior Publication Data  
US 2024/0219936 A1  Jul. 4, 2024

(30) Foreign Application Priority Data

May 4, 2021  (IT) .......................... 102021000011372

(51) Int. Cl.  
*G05D 16/16*  (2006.01)

(52) U.S. Cl.  
CPC .................................. *G05D 16/163* (2013.01)

(58) Field of Classification Search  
CPC ......... Y10T 137/7793; Y10T 137/7804; Y10T 137/7805; Y10T 137/7808; Y10T 137/7836  
See application file for complete search history.

(56) References Cited

U.S. PATENT DOCUMENTS 4,467,828 A * 8/1984 Gneiding ........... G05D 16/0658  
137/484.4  
6,257,275 B1 * 7/2001 Furbish ................ G05D 16/187  
405/185

(Continued)

FOREIGN PATENT DOCUMENTS

CN  212746018 U  3/2021  
EP  0778965 A1  6/1997

(Continued)

*Primary Examiner* — Robert K Arundale  
(74) *Attorney, Agent, or Firm* — Carmel Patent Agency; Robert Ballarini

(57) ABSTRACT

A gas regulator includes: an inlet section fluidically connected to a gas inlet in the regulator, an outlet section fluidically connected to at least one gas outlet from the regulator; a shutter assembly which is movable so as to define at least one opening position in which the gas passes from the inlet section to the outlet section through a restriction, thus generating a pressure drop of the gas, and therefore of a temperature, such as to cause the precipitation/solidification of some substances, in particular the fractions of sulfur and/or its derivative compounds, present in the gas; and an outlet filter with mechanical action which is positioned downstream of the restriction, inside said regulator, to thus retain any solid particles deriving from the precipitation/solidification. The at least one outlet of the gas from the regulator is fluidically connected with a portion downstream of the outlet filter.

19 Claims, 5 Drawing Sheets

(56) References Cited

U.S. PATENT DOCUMENTS

| | | | |
|---|---|---|---|
| 9,897,258 B2* | 2/2018 | Imboccioli | F16K 31/12 |
| 12,197,239 B2* | 1/2025 | Cecchinato | G05D 16/166 |
| 2019/0179349 A1 | 6/2019 | Amandini | |

FOREIGN PATENT DOCUMENTS

| | | |
|---|---|---|
| RU | 198155 U1 | 6/2020 |
| WO | 9607129 A1 | 3/1996 |
| WO | 2016132300 A1 | 8/2016 |

* cited by examiner

GAS REGULATOR

FIELD OF THE TECHNIQUE

The present invention relates to a regulator to be used in an apparatus for regulating gas pressure, and in particular of the type suitable for being used and installed in systems and/or networks for the transport and/or distribution of gas, such as natural gas or also gases produced in a decentralized way, such as biomethane or hydrogen.

STATE OF THE ART

As is known, pressure regulation stations are provided in gas transport and/or distribution networks to reduce the gas pressure from the supply value to the value required by the user, and also keeping it stable at the predetermined value, even in the event of variations in the upstream pressure or in the event of variations in the flow rate requested by the user.

In particular, the aforementioned pressure drop is obtained by means of pressure regulators which are configured to maintain the outlet pressure equal to a preset calibration value, regardless of the delivered gas flow rate.

A known type pressure regulator comprises a gas passage duct, having an upstream end communicating with the high pressure branch of the transport and/or distribution network, and the opposite downstream end communicating with the low pressure branch, which is directed towards the user.

In the gas passage duct there is a shutter which causes a restriction in the passage section of the duct itself, so as to cause a reduction in gas pressure between the upstream and downstream of the shutter itself. In particular, the pressure reduction occurs by lamination of the gas in correspondence with the passage section on which the shutter acts.

Conveniently, the shutter is movable so that the passage section and, therefore, the pressure drop of the gas, can be modified according to the flow rate of the gas itself.

The movement of the shutter is controlled by a feedback system which, in the presence of an increase in the pressure of the gas supplied (ie of the gas downstream from the regulator) downstream from the calibration value, reduces the degree of opening of the shutter itself, the opposite occurs in the case of a pressure reduction.

Depending on the type of control envisaged, direct-acting pressure regulation devices and pilot-operated pressure regulating devices/apparati are provided. In particular, a single regulator is provided in the direct-acting regulating devices whose degree of opening of the shutter—and in particular the degree of opening of the section for the passage of gas—is generated by the comparison between the pressure detected downstream (connected to the control head) which pushes on the movable wall (membrane) of the motorization chamber, and the thrust generated by the calibration spring. On the other hand, in piloted-action regulation apparati there is a main regulator and a further regulator, called pilot regulator; in particular, in these devices, the degree of opening of the shutter of the main regulator—and in particular of its section for the passage of gas—is controlled/commanded by the pilot regulator which, according to the compression value of its calibration spring and of the actual pressure detected downstream of the apparatus, provides the main regulator with a control pressure (motorization) suitable for bringing the apparatus into equilibrium.

Direct-acting regulating devices are simpler to build (in particular they have fewer components and fewer connections), however the level of regulation precision/accuracy is lower than with pilot-operated regulating devices. On the other hand, direct acting regulators have a much higher response speed to downstream load changes. For this reason, their applications are different: direct acting regulation devices are mainly used for medium and low pressure networks (such as civil and industrial distribution networks), with relatively low flow rates and more frequent load variations; on the other hand, the piloted-action regulation apparati are mostly used for medium and high pressure networks, where higher flow rates are required and where the variations in the required flow rate are lower and less frequent (such as transport networks).

Furthermore, according to the expected behavior in the event of breakage of the control elements (generally of the rubber membranes), the traditional pressure regulation devices/apparati can be of the "Fail to Close" type or of the "Fail to Open" type. In particular, the devices/apparati of the "Fail to Close" type (hereinafter also referred to as "FTC"), in the event of breakage, are brought into a closed condition (ie the regulator shutter closes the gas passage section, thus blocking the flow of gas downstream), thus favoring the safety of the network; the devices/apparati of the "Fail to Open" type (hereinafter also referred to as "FTO"), in the event of breakage, are brought to the open condition (ie the regulator shutter opens the gas passage section, thus allowing downstream gas flow), thus favoring the continuity of the service.

Unwantedly, in many areas of the world, the gas that enters and passes through the regulation devices/apparati contains fractions of sulfur and its derivative compounds in dispersion, for example some parts per million (ppm), which are not even detectable by the usual chemical analyses.

In particular, in the areas of the regulation device/apparatus where there are high pressure jumps, and consequent cooling, the separation from the gas of the sulfur and its derivative compounds takes place in solid parts. Therefore, the sulfur and its derived compounds thus separated is deposited on the functional parts of the main regulator and/or of the pilot regulator, thus creating problems on the seals and on the sliding parts, coming to block them.

The problem is particularly felt in the pilot regulator as the passage diameters are small and, at times, become clogged thus sending the regulator out of control.

Currently, on the market, to solve this problem, filters that act at a chemical level and are positioned upstream of the pilot regulator are used, however these filters are not always able to completely separate the sulfur and its derivative compounds, which can in any case arrive to create problems for the pilot regulator.

Furthermore, it sometimes happens that the humidity itself contained in the filter cartridges, or the humidity generated during filtration, creates problems of freezing of the pilot regulator with consequent obstruction of the passages.

US2019/179349 describes a main pressure regulator which is provided with a movable shutter unit, which is associated with a membrane of a motorization chamber, so as to define an opening position in which the gas passes from an inlet section to a outlet section through a restriction, to cause a pressure drop in the gas that passes from the inlet to the outlet section.

OBJECTIVES OF THE INVENTION

The purpose of the invention is to propose a gas regulator, in particular a gas pressure regulator, of the type to be installed in a gas transport and/or distribution network, which allows to overcome, in all or in part, to the drawbacks of the known solutions.

Another object of the invention is to propose a gas regulator which separates the sulfur and its derivative compounds contained in the gas before it enters the pilot regulator.

Another object of the invention is to propose a gas regulator which allows to mechanically separate the sulfur and its derivative compounds contained in the gas, and this without resorting to any chemical action.

Another object of the invention is to propose a gas regulator which, while separating the sulfur contained in the gas, does not retain humidity, thus avoiding the consequent drawbacks.

Another object of the invention is to propose a gas regulator which has a reduced size, thus facilitating its storage.

Another object of the invention is to propose a regulator which is easy and quick to maintain, as well as inexpensive.

Another object of the invention is to propose a regulator which can be obtained simply, quickly and with low costs.

Another purpose of the invention is to propose a regulator which is in line with the regulations in force in the sector.

Another object of the invention is to propose a regulator which has smaller dimensions and is therefore more compact than known solutions.

Another object of the invention is to propose a regulator which allows a precise regulation of the pressure of the gas passing through it.

Another object of the invention is to propose a regulator which is highly safe and reliable.

Another purpose of the invention is to propose a regulator which is an improvement and/or alternative to the traditional ones.

Another object of the invention is to propose a regulator which has an alternative characterization, both in constructive and functional terms, with respect to the traditional ones.

SUMMARY OF THE INVENTION

All the purposes mentioned herein, considered both individually and in any combination thereof, and others still which will result from the following description, are achieved, according to the invention, with a regulator as defined in claim 1.

DESCRIPTION OF THE FIGURES

The present invention is further clarified hereinafter in some of its preferred embodiments reported for purely illustrative and non-limiting purposes with reference to the attached drawings, in which.

DETAILED DESCRIPTION OF THE INVENTION AND OF SOME OF ITS PREFERRED EMBODIMENTS

Figure 1:
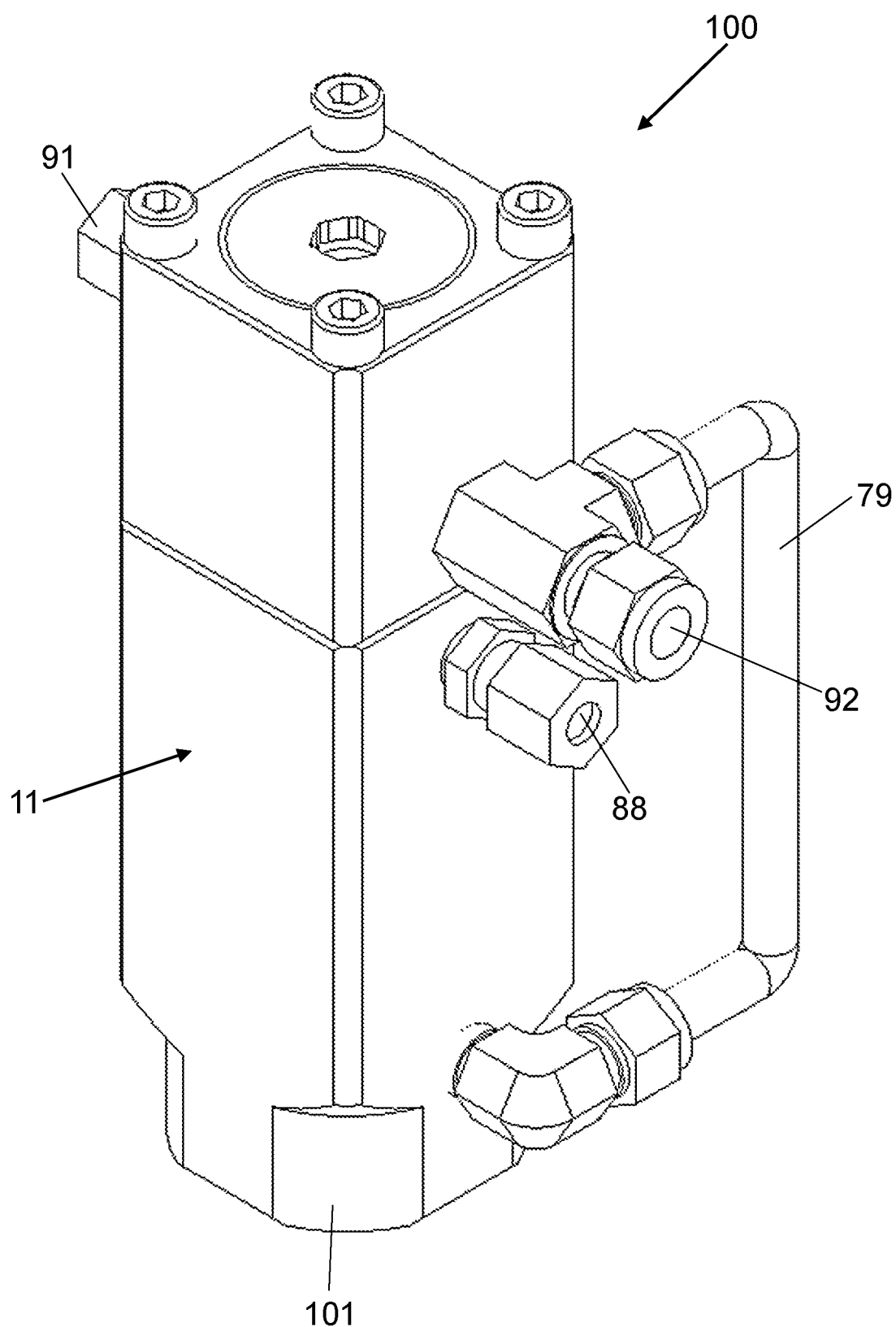
FIG. 1 shows a perspective view of a regulator according to the invention.

The present invention relates to a regulator, indicated as a whole with the reference number 100, to be installed upstream of a pilot regulator 12 in an apparatus 1, of the type with controlled action, to regulate the gas pressure, and in particular of the type suitable for installation in a gas transport and/or distribution network.

In particular, the apparatus 1 can be a traditional regulation apparatus of the piloted-action type which is suitable for causing a reduction in the pressure of the gas passing through it, and in particular for causing a reduction in the pressure of the gas from a higher value $P_{in}$, foreseen upstream and at the inlet of apparatus 1, at a lower pressure value $P_{out}$, foreseen downstream and at the exit of apparatus 1. Conveniently, the lower pressure value downstream and at the exit of apparatus 1 is preset and preferably corresponds to a calibration value of the apparatus.

In particular, the apparatus 1 is fluidically connected upstream with an inlet duct 2 and downstream with an outlet duct 3, both external to said apparatus 1.

The apparatus 1 comprises a main regulator 10, which is preferably of the traditional type, and a pilot regulator 12, which is preferably of the traditional type.

Preferably, the fluidic connections between the main regulator 10 and the pilot regulator 12 are of the traditional type and, therefore, will not be further described and, for example, they may correspond to those described and/or illustrated in EP3259650 or in the Italian patent application 102020000012916.

In particular the main regulator 10 comprises:
- an inlet area 13 which can be fluidly connected to said inlet duct 2,
- an outlet area 14 which can be fluidly connected to said outlet duct 3,
- a shutter 15 which acts between said inlet area 13 and said outlet area 14 and which is movable between a closed position, in which it interrupts the passage of gas from said inlet area 13 towards said outlet area 14, and at least one opening position in which it defines a reduction of the gas passage section from the inlet area 13 to said outlet area 14, thus causing a corresponding reduction in gas pressure from said inlet area 13 to said outlet area 14,
- means, which preferably comprise an elastic element 17, which are configured to push said shutter 15 towards said closed position,
- a motorization chamber 22 in which a movable element is housed, preferably a movable wall 25, which divides the chamber into a first sub-chamber 23 and a second sub-chamber 24.

Preferably, said first sub-chamber 23 can be fluidly connected with the outlet area 14 and/or with said outlet duct 3 at said apparatus 1.

Conveniently, in said main regulator 10, the movable wall 25 and the shutter 15 are mutually integral in translation.

In particular, the pilot regulator 12 comprises:
- an inlet section 31 which is fluidically connected—directly or via a further regulator 30—to regulator 100,
- an outlet section 32 which is fluidically connected to said second sub-chamber 24,
- at least one pilot valve 34 which regulates the passage of gas from the inlet 31 to the outlet 32 of said pilot regulator 12.

Conveniently, the pilot regulator 12 is configured so that the closing and the degree of opening of said pilot valve 34 is controlled on the basis of the difference between a calibration pressure, preferably pre-set, and the pressure of the gas in correspondence with said outlet area 14 and/or in the outlet duct 3 at the outlet of said apparatus. Conveniently, for this purpose, the pilot regulator 12 also comprises a control inlet 33 for the gas at pressure $P_{out}$, i.e. of gas at a pressure corresponding to that of the outlet area 14 and/or of the outlet duct 3, ie the pressure of the gas downstream of the apparatus 1. Conveniently, the gas that enters through the control inlet 33 acts on the spool of the pilot valve of the pilot regulator 12. In particular, the spool acts in correspondence with the lumen of passage of the gas from the inlet 31 towards outlet 32 of the pilot regulator itself.

Figure 5:
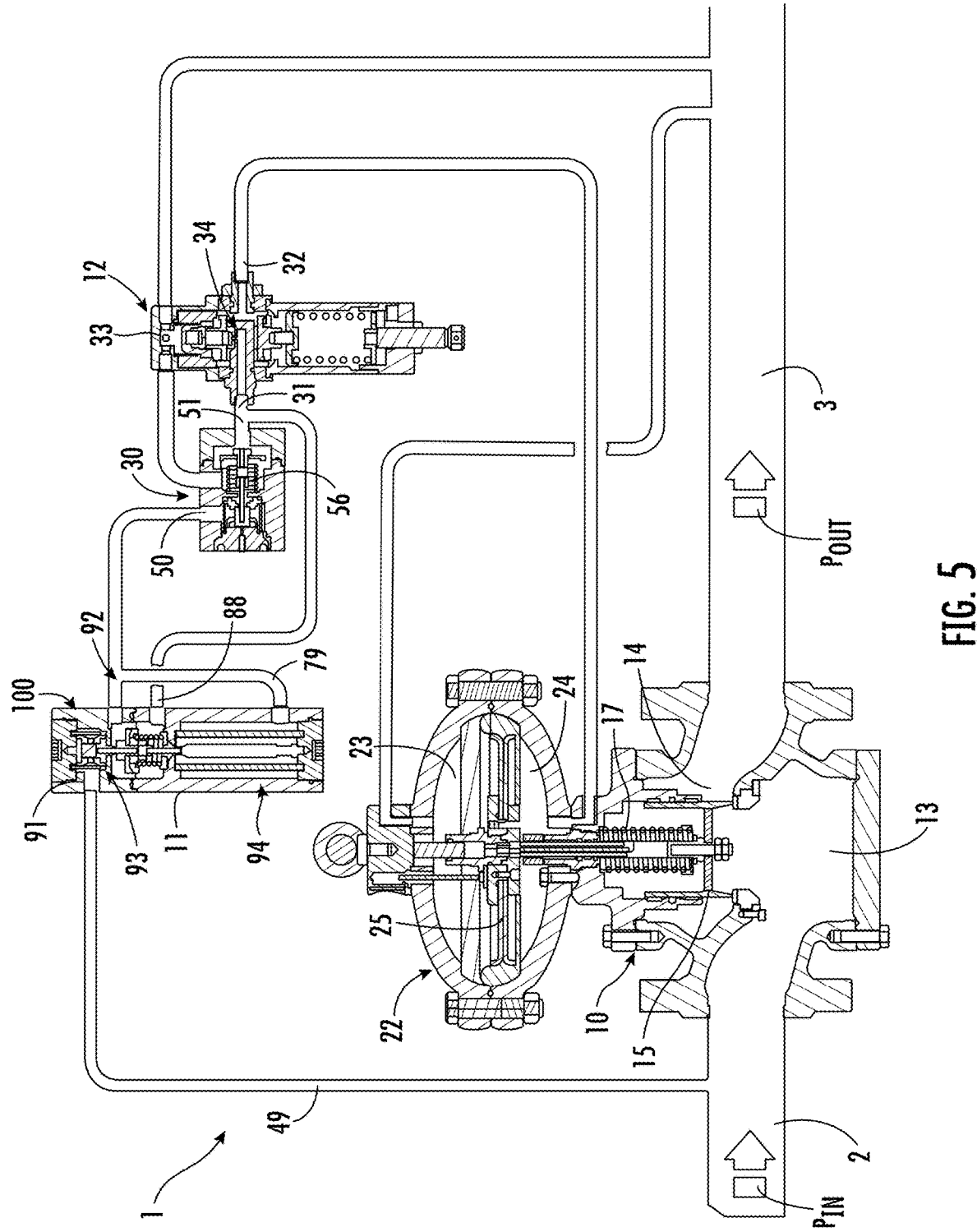
FIG. 5 shows a different configuration of a regulation apparatus regulation in which a regulator according to the invention is installed.

Advantageously, as shown in the embodiment of the apparatus of FIG. 5, a further regulator 30 can be provided to make the pilot regulator 12 work with a constant pressure jump between the pressure value at the inlet 31 and that at the control inlet 33 of said pilot regulator. Preferably, said further regulator 30 also acts as a further reducer of the inlet pressure to the pilot regulator 12 and this in addition to the pressure reduction operated by the regulator 100, as described in greater detail below. Conveniently, even if said further regulator 30 is present, most of the pressure drop is generated by the regulator 100 which is positioned upstream of the pilot regulator 12 and, also, of said further regulator 30 (if the latter is provided).

Conveniently, said further regulator 30 is configured to stabilize the operation of the pilot regulator 12 and make it operate in constant conditions, in particular at constant pressure ranges $\Delta p$, with respect to the gas pressure at the outlet of the pilot regulator 12.

The further regulator 30 comprises an inlet 50, which is connected to the outlet 92 of the regulator 100, and an outlet 51, which is connected to the inlet of the pilot regulator 12.

Conveniently, this further regulator 30 is of the traditional type. Preferably, this further regulator 30 comprises a valve which is configured to define/set the pressure at the outlet 51 of said further regulator 30 (and therefore at the inlet 31 to the pilot regulator 12) on the base:
- of a predefined pressure, which is preferably defined by the thrust of elastic means 56 provided in said further regulator 30,
- of the gas at pressure $P_{out}$ that comes from the outlet area 14 and/or from the outlet duct 3, ie the gas pressure downstream of the apparatus 1.

The regulator 100 comprises a gas inlet 91 which, suitably, is configured for receive gas at pressure $P_1$ which preferably corresponds to the pressure $P_{in}$ of the gas provided upstream and at the inlet of the apparatus 1. Conveniently, for this purpose, the gas inlet 91 of the regulator 100 is fluidically connected to the inlet duct 2 (by means of a branch 49) or with the inlet area 13 of the main regulator 10.

Figure 4:
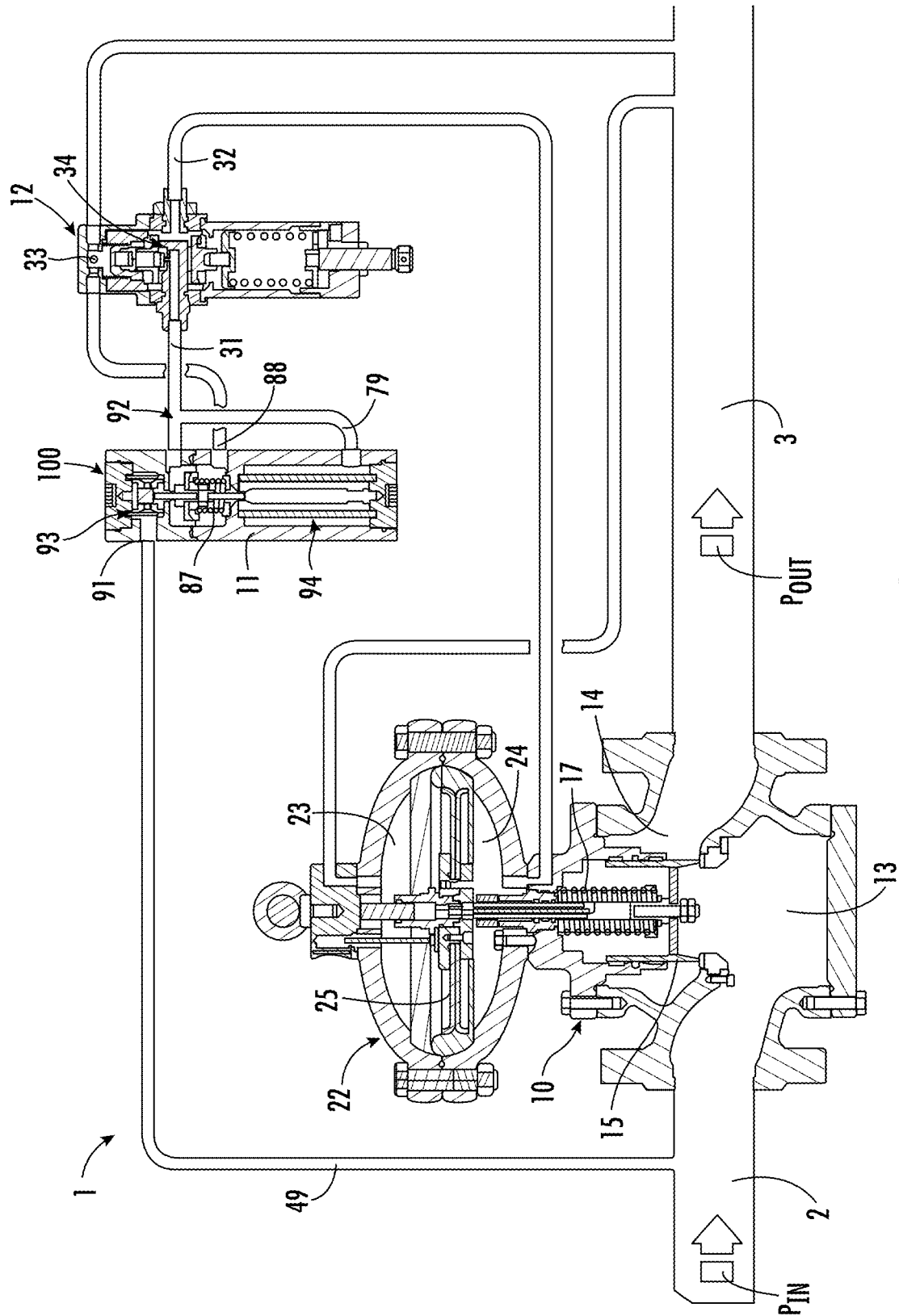
FIG. 4 shows a configuration of a regulation apparatus in which a regulator according to the invention is installed.

The regulator 100 comprises at least one gas outlet 92 which is intended to be fluidically connected directly (see FIG. 4) or by means of said further regulator 30 (see FIG. 5) with the inlet 31 of the pilot regulator 12.

In particular, the regulator 100 comprises a containment body/casing 11. The body/casing 11 can be made in a single piece or preferably in several pieces suitably fastened to each other and comprises inside it a plurality of chambers, cavities and passages, which will be recalled in the course of the following description.

The regulator 10 comprises an inlet section 93, which is and always remains in fluidic connection with the inlet 91, and an outlet section 94, which is and always remains in fluidic connection with the outlet 92.

Conveniently, both inlet 93 and outlet 94 sections are defined inside the body/casing 11 of the regulator 100. Preferably, but not necessarily, the inlet section 93 and the outlet section 94 are vertically superimposed.

Conveniently, the inlet section 93, the shutter assembly 95 and the outlet section 94 are housed, preferably superimposed on each other, inside the body/casing 11 of the regulator itself.

Conveniently, an inlet filter 89 is installed at the inlet section 93 to filter the gas entering the regulator 100 through inlet 91. Preferably, the inlet filter 89 is configured to retain any solid particles present in the gas which enters the regulator 100 through inlet 91. Preferably, said inlet filter 89 is configured to carry out the mechanical separation of the solid particles present in the gas. Preferably, said inlet filter 89 is a sintered metal powder filter.

Conveniently, the inlet section 93 comprises a (first) cavity in which the inlet filter 89 is housed, of tubular shape, so as to divide the first cavity into an external annular portion 81 into which the gas enters from the inlet 91 and a radially innermost portion 82, delimited by the internal walls of the inlet filter 89, into which only the filtered gas that has passed through the filter enters.

Conveniently, the radially innermost portion 82 of the inlet section 93 communicates with the outer annular portion 81 of the section itself only through the walls of said inlet filter 89. Basically, in general, the inlet section 93 comprises a (first) upstream portion 81 fluidically connected with inlet 91 and a (first) downstream portion 82 which is fluidically connected with (first) upstream portion 81 only through the inlet filter 89.

In particular, the gas pressure $P_1$ at the inlet section 93 corresponds to the pressure of the gas $P_{entering}$ the main regulator 10 and, therefore, can correspond to that in the inlet duct 2, and therefore to the gas pressure upstream of the apparatus 1.

Advantageously, the inlet section 93 can be configured to cause a first reduction in the pressure of the gas entering the regulator 100 from inlet 91, in particular in correspondence with wave of the inlet filter 89.

Conveniently, the inlet section 93 and the outlet section 94 communicate with each other through a passage area 96, also defined inside the body 11, in correspondence with which a reduction in gas pressure occurs, in particular a pressure reduction by gas lamination.

More in detail, the regulator 100 is configured in such a way that, preferably in correspondence with the passage area 96 between the two sections 93 and 94, it defines a restriction 83 (ie a section reduction), to thus cause a pressure drop (and hence the temperature) of the gas from the pressure $P_1$ present in the inlet section 93 to the pressure $P_2$ present in the outlet section 94.

In particular, in correspondence with the passage area 96, a shutter assembly 95 acts. More in detail, the end of the shutter assembly 95 interacts with a wall 98 of a body 99 housed in the outlet section 94 so as to define a restriction 83 (ie a reduction in section), to thus cause a drop in gas pressure from a pressure $P_1$ present in the inlet section 93 at a pressure $P_2$ present in the outlet section 94.

Conveniently, the regulator 100 is configured to cause/generate inside it most of the pressure drop of the gas (ie the fall from $P_1/P_{in}$ to $P_2$).

Conveniently, the regulator is configured in such a way as to cause a pressure drop/decrease in correspondence with the restriction 83 provided in the passage area 96 of at least 5 bar, preferably of at least 10 bar.

The consequence of this pressure drop is a decrease in temperature which, suitably, causes a precipitation/solidification of various substances, in particular the fractions of sulfur and/or its derivative compounds, present in the gas.

Therefore, the precipitation/solidification of sulfur and/or its derivative compounds (for example dithiazine), which is caused by the pressure jump/drop (as well as by the temperature), is therefore deliberately and purposely generated inside the regulator 100, preferably inside the body 11, in correspondence with the passage area 96 in which the lamination takes place.

Figure 3:
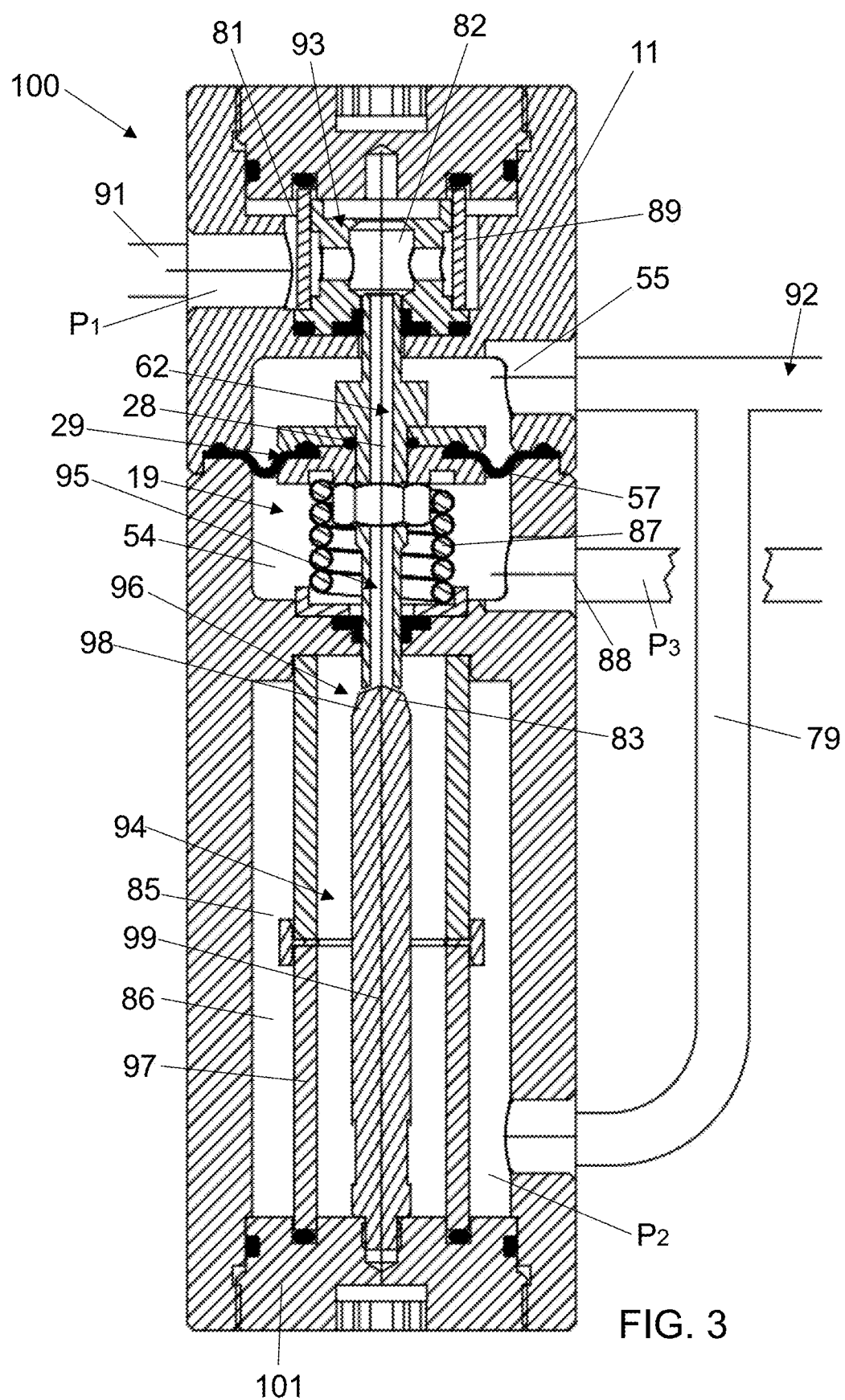
FIG. 3 shows it in the same view as in FIG. 2 in a different operating condition (ie in the closed position of the shutter unit)

The shutter assembly 95 of the regulator 100 is movable so as to define at least one opening position of said restriction 83 (see FIG. 3), to allow the passage of the gas, and a corresponding drop in gas pressure, from the section of inlet 93 to the outlet area 14 through said restriction 83.

Figure 2:
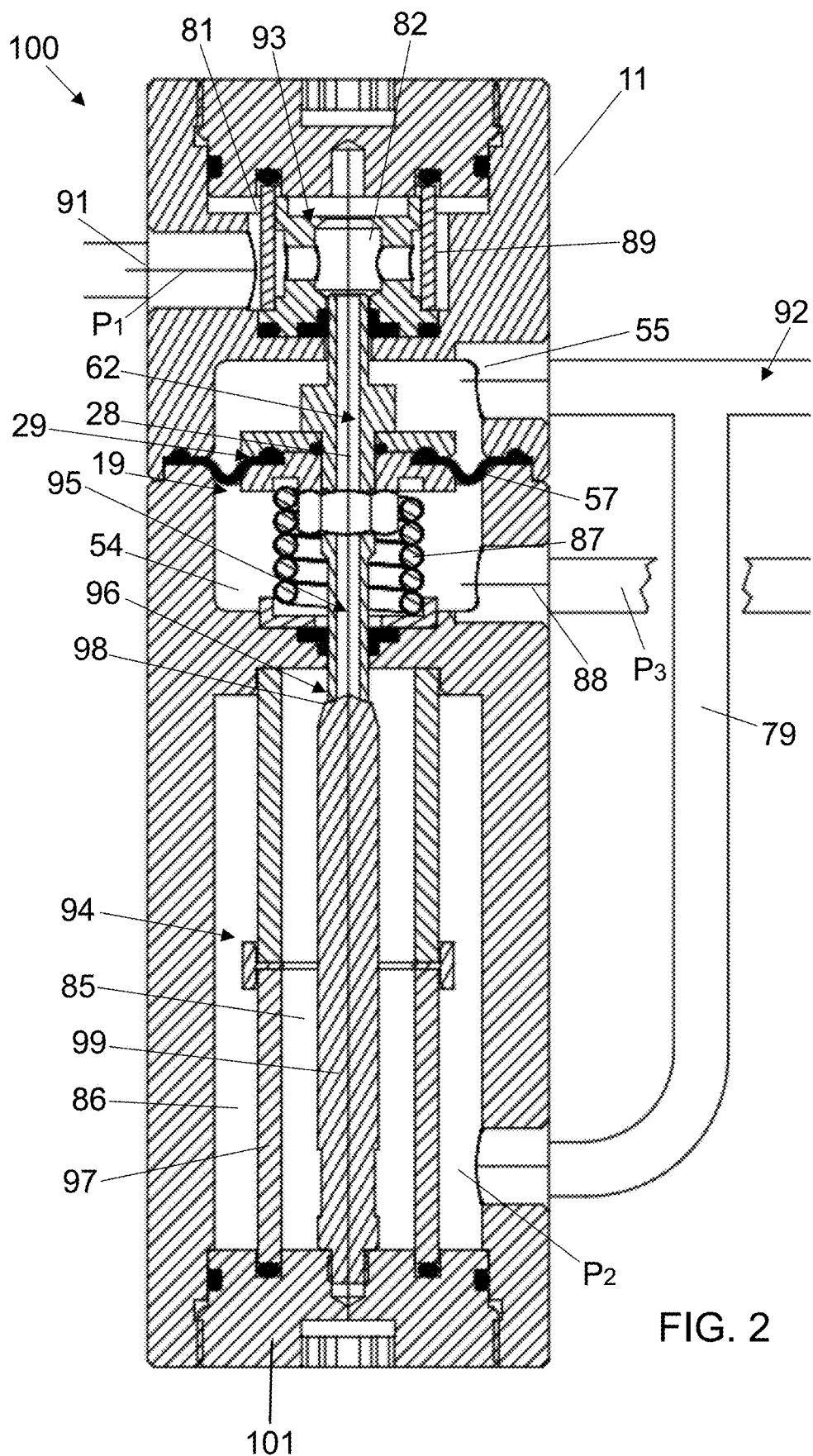
FIG. 2 shows it in a schematic view according to a longitudinal section thereof in a first condition (ie in the closed position of the shutter unit)

Conveniently, in more detail, the shutter assembly 95 of the regulator 100 is movable between:
- a closing position of said restriction 83 (see FIG. 2), to substantially interrupt/block the passage of gas from the inlet section 93 to the outlet section 94, and therefore substantially interrupt/block the passage of gas towards the outlet of regulator 100, and
- at least one opening position of said restriction 83 (see FIG. 3), to thus allow the passage of gas, and a corresponding pressure drop of the gas, from the inlet section 93 to the outlet area 14 through said restriction 83.

Conveniently, the shutter assembly 95 can be movable between a plurality of opening positions to increase or decrease the passage section of the aforementioned restriction 83, and thus keep the pressure drop from $P_1$ to $P_2$ flow rate required by the pilot regulator 12 varies.

Preferably, the regulator 100 is configured so that the shutter assembly 95 is unbalanced towards the closed position. In particular, for this purpose, the thrust towards the closed position that the gas exerts on the part of the shutter assembly 95 which acts in the inlet section 93 is greater than the thrust towards the open position exerted by the gas on the part of the shutter assembly 95 which acts in the outlet section 94.

Conveniently, the regulator 100 comprises an inlet filter 89 which is positioned upstream of the restriction 83 and/or of the shutter assembly 95.

According to the present invention, inside the regulator 100 itself, and at downstream of the restriction 83 where the pressure drop occurs, an outlet filter 97 with mechanical action is provided, in order to retain any solid particles deriving from their precipitation/solidification caused by the pressure drop that occurs at the restriction 83.

Gas outlet 92 from said regulator is fluidically connected to the portion 86 downstream of said outlet filter 97.

Advantageously, downstream of the passage area 96, inside the outlet section 94 there is installed an outlet filter 97 with mechanical action which is configured to retain any solid particles—and deriving mainly from their precipitation/solidification resulting from the fall of pressure, and therefore temperature, which occurs in the passage area 96 in correspondence with the restriction 83—present in the gas which will then exit the regulator 100 through the outlet 92.

Conveniently, the outlet filter 97 is configured to capture and retain the solid particles, in particular of sulfur and its derivative compounds, which are formed in the face of the balance/pressure drop that is generated inside the regulator 100 itself in correspondence with the passage area 96, between the inlet section 92 and the outlet section 94, zone in which lamination occurs.

Advantageously, the filtering surface of the outlet filter 97 is greater, preferably much greater (for example it is at least 50 times larger), than the passage section (lumen) of the outlet 92 of the regulator, or in any case than the passage section (lumen) of the pilot valve 34 of the pilot regulator 12, in such a way as to ensure sufficient autonomy and duration of the filter 97 before the necessary maintenance.

Preferably, said outlet filter 97 is configured to carry out the mechanical separation of the solid particles present in the gas. Preferably, said outlet filter 97 is a filter made of sintered metal powder.

Conveniently, the outlet section 94 comprises a (second) upstream portion 85 fluidly connected with the passage area 96 and a (second) downstream portion 86 which is fluidically connected with the (second) upstream portion 85 only through the outlet filter 97.

Conveniently, the outlet section 94 comprises a second cavity in which the outlet filter 97 is housed, of tubular shape, so as to divide the second cavity into:
- a radially innermost portion 85, bounded by the internal walls of the outlet filter 97, into which the gas that has passed through the passage area 96 enters, and
- an outer annular portion, corresponding to the downstream portion 86 of said outlet filter 97, into which only the filtered gas enters which, coming from the radially innermost portion 85, has passed through the outlet filter 97.

Conveniently, the radially innermost portion 85 of the outlet section 94 communicates with the external annular portion 86 only through the walls of said outlet filter 97.

Conveniently, inside the outlet section 94, and in particular inside the second cavity, it is housed—preferably in removable way—the body 99 which is provided at one end with a wall 98 interacting with the end of the shutter assembly 95.

Advantageously, the wall 98 of the body 99 which interacts with the shutter assembly 95 has a geometric shape such as to favor the discharge towards the outlet filter 97 of the solid particles, in particular of sulfur and its derivative compounds, which separate due to the drop in pressure and which is generated in correspondence with the restriction 83 which forms in the passage area 96. In particular, in this row, the wall 98 of the body 99 which interacts with the shutter assembly 95 has a substantially hemispherical or truncated cone shape.

Conveniently, the radially innermost portion 85 of the outlet section 94 is defined by an annular portion delimited internally by the external walls of the body 99 and externally by the internal walls of the outlet filter 97.

Advantageously, the regulator 100 comprises, in correspondence with one of its end, a closure cap 101 on which the body 99 and/or the outlet filter 97 are mounted. Preferably, the outlet filter 97 is removably mounted on the closure cap 101. Conveniently, therefore, by removing the closure cap 101 it is possible to access and/or remove the body 99 and/or the outlet filter 97, thus allowing their cleaning and/or replacement. Basically, for maintenance against and/or subsequent clogging, it is sufficient to remove the closure cap 101 and thus extract the body 99 and/or the outlet filter 97, in order to proceed with their cleaning and/or replacement.

Preferably, the regulator 100 comprises a closure cap 101 which is removably associated with the body/casing 11 to allow access and/or removal of said outlet filter 97 housed in the outlet section 94 of the regulator itself.

Advantageously, the body 99 is made of polymeric material, in particular plastic, which is preferably rigid—for example it is made of PTFE or similar polymeric materials—so as to reduce the adhesion of sulfur and its derivative compounds, and to facilitate their cleaning at the moment of maintenance. Furthermore, advantageously, the body 99 is made of polymeric material so as to reduce its heat exchange (with respect for example to a corresponding metal body) with the cooled gas, thus reducing the lowering of the temperature of the body 99 and therefore also the deposit of solid particles on the body itself.

Conveniently, in a possible embodiment, the shutter assembly 95 and the body 99 are configured (for example in terms of materials) so that, in correspondence with the passage area 96, there is not necessarily a perfect seal (i.e. the block total of the passage of the gas towards the outlet 92) when the shutter assembly 95 is in the closed condition, in particular in the face of the fact that the seal can then be obtained by means of a further regulator 30 (if provided). For this purpose, for example, the body 99 of the regulator 100 can be made of rigid plastic material, easier to clean, rather than of deformable plastic material.

Advantageously, the shutter assembly 95 is housed, at least in part, in the outlet section 94 and is movable inside the latter.

Conveniently, in a possible embodiment, the body/casing 11 comprises within it an internal cavity 19 which, preferably, is interposed between the inlet section 93 and the outlet section 94.

Conveniently, an elastic element 87 is housed in the internal cavity 19 and, moreover, at least a part of the shutter assembly 95 is also housed. Preferably, the shutter assembly 95 crosses from side to side the internal cavity 19 which is interposed between the inlet section 93 and the outlet section 94.

Advantageously, in a possible and preferred embodiment such as that shown in the figures, the outlet section 94 is positioned below the internal cavity 19 which, in turn, is positioned below the inlet section 93 of the regulator 100.

In particular, said regulator 100 comprises a valve 29 which acts in said internal cavity 19 and which is configured to define/set the pressure in correspondence of the outlet 92 of said regulator on the basis of:

a predefined pressure, which is preferably defined by the thrust of the elastic element 87 provided in said regulator 100, of the pressure $P_3$ of the gas entering said regulator 100, and in particular inside the internal cavity 19, through a further inlet 88.

Preferably, the pressure $P_3$ of the gas at said further inlet 88 can correspond to the pressure $P_{out}$ of the gas at the outlet area 14 and/or the outlet duct 3, ie the gas pressure downstream of the apparatus 1 (see FIG. 4, and also connected to the control inlet 33 of the pilot regulator 12) or to the pressure of the gas at the outlet 51 from said further regulator 30 (see FIG. 5).

Conveniently, in this way, the pressure at the outlet 92 of the regulator 100 is such as to be higher than that required by the pilot regulator 12 to operate. In particular, this allows to have at the inlet 31 of the pilot regulator 12 a pressure greater than the pressure $P_{out}$, foreseen downstream and at the outlet of the apparatus 1, and in particular a pressure such that then at the outlet 32 of the pilot regulator itself there is sufficient pressure to supply the motorization chamber 22 (and in particular the second sub-chamber 24) of the main regulator 10.

Conveniently, a movable member 57 is housed in said internal cavity 19 which divides said internal cavity into a first zone 54 and in a second zone 55. In particular, the two zones 54 and 55 of the internal cavity 19 always remain fluidically separated from each other. The first zone 54 is fluidically connected with said further inlet 88 which, suitably, can be in fluidic connection with the outlet of said apparatus 1 (see FIG. 4) or with the outlet of said further regulator 30 (see FIG. 5). Furthermore, said elastic element 87 (for example defined by a helical spring), which is preferably housed inside the first zone 54 is housed, acts on said movable member 57 in addition to the thrust action given by the pressure of the gas entering in the first zone 54 through said further inlet 88.

Conveniently, the movable member 57 is associated with the shutter assembly 95 and, preferably, is mounted on the shutter assembly 95 so that the movement of the shutter assembly 95 also causes the movement of the movable member, and vice versa.

The second zone 55 of the internal cavity 19 of said regulator 100 is fluidically connected with the outlet section 94 of said regulator 100 and with the outlet 92 of said regulator 100.

Conveniently, regulator 100 is configured so that the pressure in the second zone 55—pressure which also corresponds to the pressure in the downstream portion 86 of the outlet filter 97 and to the pressure at the outlet 92—is defined by the pressure of the gas entering the first zone 54 through said further inlet 88 and by a preset calibration value which, preferably, is defined by the contribution of the elastic element 87 which acts said movable member 57.

Conveniently, the fluidic connection between the second zone 55 of the internal cavity 19 and the outlet section 94 can be obtained by means of a connection duct 79 which is external to the body 11 of the regulator 100 (as illustrated in the figures), but could also be obtained by means of a connection duct 79 which is obtained inside the body 11.

Conveniently, moreover, both the second zone 55 of the internal cavity 19 and the outlet section 94 are in fluidic connection with the outlet 92.

Therefore, advantageously, said regulator 100 is configured in such a way that the pressure of the gas at its outlet 92 (and therefore at the inlet of the pilot regulator 12 directly or indirectly through the further regulator 30) depends substantially on the thrust that the movable member 57 exerts on the gas present at the inside of said second zone 55 and, suitably, in turn this thrust depends and/or is substantially defined, on the other face of the movable member 57, by the combined action of the elastic element 87 and the pressure of the gas present in the first zone 54 (and entering through said further inlet 88).

In particular, the gas present in the first zone 54 is that which enters the regulator 100 through said further inlet 88 which can be connected with the outlet of said further regulator 30 or with the outlet of said apparatus 1.

In substance, said regulator 100 is configured so that the pressure at its outlet 92 and therefore at the inlet of the pilot regulator 12—is defined by the thrust of the elastic element 87 to which the pressure $P_3$ of the gas is added, which is taken downstream of said regulator 100, and which enters the latter through said further inlet 88.

Advantageously, therefore, the gas that enters the regulator 100 through said further inlet 88 reaches the first zone 54 of the internal cavity 19 to thus act—in combination with the elastic element 87—on the movable member 57, to thus increase the pressure of the gas which is inside the second zone 55 and which is fluidically connected with the outlet 94 and, in particular, with the portion of the outlet section positioned downstream of the outlet filter 97.

Conveniently, the gas pressure at outlet 92 is mainly given by the pressure which is defined in the second zone 55 (and corresponding to that resulting from the thrust of the elastic element 87 and from the pressure of the gas $P_3$ taken downstream of the regulator itself and entering the cavity 19 through said further inlet 88).

Conveniently, if said further regulator 30 is not provided (see FIG. 4), at the inlet 31 of the pilot regulator 12 there is the gas coming from the outlet 92 of the regulator 100 (and corresponding to the one that has passed through the outlet filter 97 of the outlet section 94) and which has a pressure equal to $P_{out}$ (and corresponding to the pressure of the gas entering the first zone 54 through said further inlet 88) plus the contribution of the elastic element 87 of the same regulator 100. Conveniently, if instead, said further regulator 30 is provided (see FIG. 5), at the inlet 31 of the pilot regulator 12 there is the gas coming from the outlet 92 of the regulator 100 (and corresponding to that which has passed through the outlet filter 97 of the outlet 94) and that the pressure of which is reduced so as to have a pressure equal to $P_{out}$ (and corresponding to the pressure of the gas entering the first zone 54 through said further inlet 88) plus the contribution of the elastic means 56 *d* the said further regulator 30.

Conveniently, in the regulator 100 according to the invention, the pressure of the gas entering the regulator 100 is significantly reduced through the restriction 83 which is defined in correspondence with the passage area 96, to thus cause precipitation/separation solid particles (in particular sulfur and its derivative compounds) present in the gas.

Conveniently, moreover, the gas that circulates and that is compressed in the second zone 55 is gas that comes from the portion 86 downstream of the outlet filter 97 provided in the outlet section 94, and is therefore gas that has passed through the outlet filter 97 which has thus retained any solid particles that may be present. Conveniently, therefore, in the second zone 55, in the connection duct 79 and in correspondence with the outlet 92 of the regulator 100, gas circulates which has been previously purified from the solid particles.

Advantageously, the inlet section 93 of the regulator 100 is in fluid communication with the passage area 96, and therefore with the outlet section 94 by means of a fluidic connection section 62 which, suitably, can be obtained inside the body/casing 11 and/or externally through a dedicated circuit.

In particular, advantageously, in the embodiment illustrated in the figures, the shutter assembly 95 comprises inside a passage duct 28 which defines said fluidic connection section 62 and which passes through the shutter unit 15 to thus put in fluidic connection the inlet section 93 with the passage area 96, and therefore with the outlet section 94.

Conveniently, in a possible embodiment not shown here, the inlet section 93 can be obtained in the body 99. Conveniently, in another possible embodiment not shown here, the fluidic connection section 62 between the inlet section 93 and the outlet section 94 can be obtained in the body 99.

Conveniently, the shutter assembly 95 of the regulator 100, as well as the movable member 57, can be defined by one or more elements of suitable shape (and therefore installed and acting in a seat of corresponding shape provided in the respective regulator), and they can be made of rigid or elastic material, and in particular they can be wholly or partially of the membrane type, optionally with at least one elastically deformable zone.

The present invention also relates to a method for decreasing or preventing solid particles, in particular of sulfur or its derivative compounds which may be formed by solidification/precipitation of dispersed fractions present in the gas, from reaching the pilot regulator, in which it is provided upstream of the pilot, a dedicated regulator 100, as described and illustrated above, which is configured in such a way as to generate a significant pressure (and therefore temperature) drop/variation inside it, preferably of at least at least 5 bar, and more preferably of at least 10 bar, of the gas pressure entering said regulator and so that the gas resulting from said pressure and temperature drop/variation passes through a mechanical outlet filter always provided inside the same dedicated regulator.

From what has been said it is clear that the regulator according to the invention is advantageous in that it allows to achieve the preset purposes and, in particular, allows:

to absorb in a dedicated regulator, before the gas enters the pilot regulator, a large part of the pressure jump of said gas, and consequently of the temperature jump that causes the precipitation/solidification in particles of the sulfur and/or its derivative compounds present in the gas itself, thus retaining the solid particles thus formed, it can be used in combination with a further traditional regulator (pre-reducer) which is configured to cause the pressure reduction suitable for the operation of the pilot regulator, so that it is this further traditional regulator that guarantees the downstream seal, to mechanically separate the sulfur, and its derivative compounds, from the gas upstream of the pilot regulator, and this without resorting to any chemical action, has a small footprint, thus facilitating storage, it does not have elements that retain humidity, thus avoiding the consequent inconveniences, can be easily disassembled to replace the clogged or worn components, which can then be easily disposed of in it.

The present invention has been illustrated and described in one of its preferred embodiments, but it is understood that executive variations may be applied to it in practice, without however departing from the scope of protection of the present patent for industrial invention.

The invention claimed is:

1. A gas regulator (100), configured to be installed upstream of a pilot regulator (12) in a pilot-operated type of gas regulating apparatus (1) configured for installation in a transport network and/or gas distribution, the gas regulator comprising: an inlet section (93) fluidically connected to a gas inlet (91) in said regulator, an outlet section (94) fluidically connected to at least one gas outlet (92) from said regulator, a shutter assembly (95) which is movable so as to define at least one opening position in which the gas passes from the inlet section (93) to the outlet section (94) through a restriction (83), thus generating a pressure drop of the gas, and therefore of a temperature, such as to cause the precipitation/solidification of some substances, in particular the fractions of sulfur and/or its derivative compounds, present in said gas, an outlet filter (97) with mechanical action which is positioned downstream of said restriction (83), inside said regulator (100), to thus retain any solid particles deriving from said precipitation/solidification, said at least one outlet (92) of the gas from said regulator is fluidically connected with a portion (86) downstream of said outlet filter (97); wherein inside the outlet section (94) is removably housed a body (99) which is provided at one end with a wall (98) interacting with an end of the shutter assembly (95) during the closing position or of at least one opening of said shutter assembly (95), to thus define said restriction (83).

2. The regulator according to claim 1, wherein the filtering surface of the outlet filter (97) is greater than the passage section of the at least one outlet (92) of the regulator itself or the passage defined at the pilot valve (34) of the pilot regulator (12) configured to be positioned downstream of said regulator.

3. The regulator according to claim 1, wherein at the inlet section (93) an inlet filter (89) is installed which is configured to filter the gas entering the regulator (100) through the inlet (91).

4. The regulator according to claim 1, wherein the outlet filter (97) is housed in the outlet section (94) of said regulator.

5. The regulator according to claim 1, wherein the shutter assembly (95) is movable inside the outlet section (94).

6. The regulator according to claim 1, wherein the outlet filter (97) has a tubular shape.

7. The regulator according to claim 1, wherein the outlet section (94) comprises a second cavity in which the outlet filter (97), of tubular shape, is housed, so as to divide the second cavity into:
a radially innermost portion (85), bounded by the internal walls of the outlet filter (97), into which the gas that has passed through the restriction (83) enters, and
an external annular portion (86) into which only the filtered gas enters which, coming from the radially innermost portion (85), has passed through the outlet filter (97),
and wherein the radially innermost portion (85) of the outlet section (94) communicates with the outer annular portion (86) of the outlet section (94) only through the walls of said outlet filter (97).

8. The regulator according to claim 1, wherein the wall (98) of said body (99) which interacts with the shutter assembly (95) has a geometric shape such as to favor the discharge towards the outlet filter (97) of the solid particles of sulfur and/or its derivative compounds, which separate in the face of the pressure drop that is generated in correspondence with the restriction (83).

9. The regulator according to claim 1, further comprising a removable closure cap (101) on which the body (99) and the outlet filter (97) are mounted, so that the removal of said closure cap (101) allows the access and/or removal of said body (99) and of said outlet filter (97).

10. The regulator according to claim 1, wherein the body (99) is made of rigid polymeric material, to thus reduce the heat exchange with the gas and also to facilitate cleaning.

11. The regulator according to claim 1, further comprising a removable closure cap (101) for accessing and/or removing said outlet filter (97) housed in the outlet section (94) of the regulator itself.

12. The regulator according to claim 1, further comprising a body/casing (11) wherein the inlet section (93), the shutter assembly (95) and the outlet section (94) are housed, superimposed on each other, inside said body/casing (11).

13. The regulator according to claim 1, wherein the regulator is configured in such a way as to cause a pressure drop/decrease of at least 5 bar in correspondence with said restriction (83).

14. The regulator according to claim 1, wherein said shutter assembly (95) of the regulator (100) is movable between:
a closing position of said restriction, to substantially interrupt/block the passage of gas from the inlet section (93) to the outlet section (94), and therefore substantially interrupt/block the passage of gas towards the outlet of the regulator (100), and
dictates at least one opening position of said restriction (83), to thus allow the passage of gas, and a corresponding drop in gas pressure, from the inlet section (93) to the outlet area (14) through said restriction (83).

15. The regulator according to claim 1, further comprising an internal cavity (19) in which a valve (29) acts which is configured to define/set the pressure at the at least one outlet (92) of said regulator based on:
a predefined pressure, which is preferably defined by the thrust of an elastic element (87) provided in said regulator (100),
the pressure $P_3$ of the gas entering said regulator (100) through a further inlet (88).

16. The regulator according to claim 15, wherein said valve (29) of said internal cavity (19) comprises a movable member (57) which divides said internal cavity into a first zone (54) and into a second zone (55) which always remain fluidly separated from each other, and in which:
said first zone (54) is fluidically connected to said further inlet (88) which is intended to be in fluidic connection with the outlet of the piloted-action apparatus (1), in which said regulator (100) is intended to be installed, or is intended to be in fluidic connection with a further regulator (30) which is positioned upstream of the pilot regulator (12) of the piloted-action apparatus (1), in which said regulator (100) is intended to be installed,
said second zone (55) is fluidically connected with the portion of said outlet section (94) which is downstream of said mechanical outlet filter (97) and with the at least one outlet (92) of said regulator (100),
and wherein said elastic element (87) is configured to act on said movable member (57) in addition to the thrust action given by the pressure of the gas which enters the first zone (54) through said further inlet (88).

17. An apparatus (1) with piloted action to regulate gas pressure of the type suitable for use and installed in systems and/or networks for the transport and/or distribution of gas, said apparatus being intended to be connected upstream with a gas inlet duct (2) in said apparatus and downstream with an outlet duct (3), wherein the apparatus comprises a regulator (100) according to claim 1 in which the at least one outlet (92) is directly connected to the inlet (31) of a pilot regulator (12) of a main regulator (10).

18. An apparatus (1) with piloted action to regulate gas pressure of the type suitable for use and installed in systems and/or networks for the transport and/or distribution of gas, said apparatus being intended to be connected upstream with a gas inlet duct (2) in said apparatus and downstream with an outlet duct (3), wherein the apparatus comprises a regulator (100) according to claim 1, in which the at least one outlet (92) of said regulator (100) is connected with the inlet (50) of a further regulator (30) which, in turn, at the outlet is connected with the inlet (31) of a pilot regulator (12) of a main regulator (10), said further regulator (30) comprises a valve configured to define/set the pressure at the inlet (31) of said pilot regulator (12) on the basis of:
a predefined pressure, which is defined by the thrust of elastic means (56) provided in said further regulator (30),
the pressure $P_{out}$ of the gas downstream of the apparatus (1).

19. A method to reduce or avoid that solid particles, in particular of sulfur or its derivative compounds that can be formed by solidification/precipitation of dispersed fractions present in the gas, arrive at a pilot regulator (12), the method comprising positioning upstream of the pilot regulator (12) a regulator (100) according to claim 1, said regulator (100)

being configured in such a way as to generate a pressure drop/variation inside it, preferably of at least at least 5 bar of the gas pressure entering said regulator (100) and so that the gas resulting from said pressure and temperature drop/variation, passes through said mechanical outlet filter (97) which is mounted inside said regulator (100).

\* \* \* \* \*